United States Patent
Gray

(10) Patent No.: US 7,631,064 B1
(45) Date of Patent: Dec. 8, 2009

(54) METHOD AND APPARATUS FOR DETERMINING INTERCONNECTIONS OF NETWORK DEVICES

(75) Inventor: Mark Gray, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 829 days.

(21) Appl. No.: 09/835,059

(22) Filed: Apr. 13, 2001

(51) Int. Cl.
*G06F 15/173* (2006.01)
*G06F 15/16* (2006.01)

(52) U.S. Cl. .................. 709/224; 709/223; 709/227

(58) Field of Classification Search ............... 709/224, 709/208, 223, 227; 713/2
See application file for complete search history.

(56) References Cited

U.S. PATENT DOCUMENTS

| | | | |
|---|---|---|---|
| 4,591,967 A | | 5/1986 | Mattes et al. |
| 5,163,130 A | | 11/1992 | Hullot |
| 5,347,167 A | * | 9/1994 | Singh .......................... 307/125 |
| 5,504,670 A | | 4/1996 | Barth et al. |
| 5,574,914 A | | 11/1996 | Hancock et al. |
| 5,590,284 A | | 12/1996 | Crosetto |
| 5,659,786 A | | 8/1997 | George et al. |
| 5,835,720 A | * | 11/1998 | Nelson et al. ............... 709/224 |
| 5,845,081 A | * | 12/1998 | Rangarajan et al. ......... 709/224 |
| 5,925,131 A | * | 7/1999 | Novoa et al. ................ 713/300 |
| 5,948,055 A | * | 9/1999 | Pulsipher et al. ............ 709/202 |
| 5,951,683 A | | 9/1999 | Yuuki et al. |
| 5,983,269 A | * | 11/1999 | Mattson et al. ............. 709/221 |
| 6,047,330 A | * | 4/2000 | Stracke, Jr. ................. 709/238 |
| 6,125,449 A | * | 9/2000 | Taylor et al. ................ 713/310 |
| 6,163,849 A | * | 12/2000 | Nouri et al. ................. 713/324 |
| 6,169,475 B1 | * | 1/2001 | Browning .............. 340/286.02 |
| 6,202,160 B1 | * | 3/2001 | Sheikh et al. ............... 713/310 |
| 6,381,700 B1 | * | 4/2002 | Yoshida ...................... 713/201 |

(Continued)

FOREIGN PATENT DOCUMENTS

EP 0 262 750 A2 4/1988

(Continued)

OTHER PUBLICATIONS

Elliotte Rusty Harold, "XML: Extensible Markup Language," 1998, pp. 1-431.

(Continued)

*Primary Examiner*—Ramsey Refai
(74) *Attorney, Agent, or Firm*—Osha • Liang LLP

(57) ABSTRACT

A method and apparatus is disclosed for determining interconnections of network devices. The network devices are connected together based on a set of general guidelines. A first network device is associated with a power state that is changed. Whether an alteration occurs at a second network device in response to the change in power state of the first network device is identified and stored. The changing of the power state of the first network device may be in response to a third network device and may be performed via a power controller. The alteration at the second network device may be a link becoming hot or the raising of a trap that is set at a switch. Errors are identified by comparing whether an alteration is identified to information in a database. Different types of interconnections may be determined in a series of phases by testing different types of devices.

21 Claims, 5 Drawing Sheets

U.S. PATENT DOCUMENTS

| | | | |
|---|---|---|---|
| 6,446,141 B1 | 9/2002 | Nolan et al. | |
| 6,453,423 B1 * | 9/2002 | Loison | 713/310 |
| 6,493,824 B1 * | 12/2002 | Novoa et al. | 713/162 |
| 6,507,273 B1 * | 1/2003 | Chang et al. | 340/3.1 |
| 6,516,345 B1 * | 2/2003 | Kracht | 709/220 |
| 6,553,499 B1 * | 4/2003 | Weigold et al. | 713/300 |
| 6,628,623 B1 * | 9/2003 | Noy | 370/255 |
| 6,654,802 B1 * | 11/2003 | Oliva et al. | 709/224 |
| 6,687,348 B2 * | 2/2004 | Cromer et al. | 379/102.04 |
| 6,728,670 B2 * | 4/2004 | Schenkel et al. | 704/224 |
| 6,760,850 B1 * | 7/2004 | Atkinson et al. | 713/320 |

FOREIGN PATENT DOCUMENTS

| | | |
|---|---|---|
| EP | 0 750 256 A2 | 12/1996 |
| EP | 0 905 621 A1 | 3/1999 |

OTHER PUBLICATIONS

Radek Vingralek, et al., "Snowball: Scalable Storage on Networks of Workstations with Balanced Load," pp. 117-156, Distributed and Parallel Databases, vol. 6, No. 2, Apr. 1998, XP-002162201.

Armando Fox, et al., "Cluster-Based Scalable Network Services," pp. 78-91, Operating Systems Review (SIGOPS), US, ACM Headquarter, New York, vol. 31, No. 5, Dec. 1, 1997, XP-000771023.

* cited by examiner

METHOD AND APPARATUS FOR DETERMINING INTERCONNECTIONS OF NETWORK DEVICES

FIELD OF THE INVENTION

The present invention generally relates to networks. The invention relates more specifically to a method and apparatus for determining interconnections of network devices.

BACKGROUND OF THE INVENTION

Today, increasingly large and more complex networks are being created and used to provide services for companies worldwide. Such networks may consist of many devices that are linked together by numerous connections. There is also a large variety of types of network devices that may be used. For example, the types of network devices include, but are not limited to, switches, routers, bridges, central processing units (CPU's), storage devices, terminal servers, load balancers, firewalls, external hubs, or any other device that may be incorporated into a network. Use in a network may involve a densely packed equipment rack.

Furthermore, there may be differences among types of network devices depending on other factors, such as the specific role for a particular network device or the identity of the manufacturer of the network device. Also, there is a large variety of types of connections between network devices, such as serial connections, various forms of Ethernet, and fiber connections. All of the variations in network devices, functions performed by the network devices, differences among manufacturers, and variations in interconnections result in highly differentiated and complex networks.

In order to create, modify, operate, and maintain such networks, it is often desirable to know the details of the interconnections among the many network devices. Detailed knowledge about the connections may be particularly important for some types of networks, such as outsourcing facilities that host Web sites or servers by co-locating such resources for a number of customers. Outsourcing facilities provide physical space and redundant network and power facilities so that the enterprise customer or user need not provide them. The network and power facilities are shared among many enterprises or customers. A "server farm" is one example of such a network in which servers and other network devices are made available for use by a variety of other clients or companies.

Because server farms have a large number of network devices that are located in a centralized area, it is often desirable to know the boundaries of the hardware designated for use by each company or client. Operators of the server farm would like to know the details of the interconnections between network devices in the server farm.

The information desired by the server farm operators may include not just which network devices are connected together in a logical sense (e.g., network connectivity), but also the details of the physical connections. For example, the physical connection information may include identifying with which cables the devices are connected and on which ports of the devices those cables are attached. The information may also include the various types of connections between the network devices and distinguish between power connections, serial connections, Ethernet, and fiber connections.

Another problem encountered in the server farm environment is that the density of the equipment racks containing the network devices is increasing so that more network devices may be contained within the same physical space. The increased density results in a more crowded deployment of the network devices, which makes it increasingly difficult for a technician to physically trace all of the connections to ensure that they have been established correctly.

One approach for determining the interconnections among the devices of a network is to establish a rigid specification or definition that prescribes how each network device is connected to other network devices. For example, for a network device "A," such a definition might specify that network device "A" is to be connected via a connection "B" to a port "C" on a network device "D."

Once a type of rigid definition is established, the network may be constructed according to detailed specifications of how each network device is to be connected to the other network devices. The rigid definition approach may be effective if the number of network devices is small because the limited number of interconnections makes it feasible to manually verify each connection between the network devices and correct any problems or mistakes.

However, as the number of network devices, the types of network devices, the number of connections and the types of connections all increase, the effectiveness of the rigid definitional approach decreases. In particular, the more network devices and connections there are, the more difficult it is to test each connection and identify those connections that are misconnected or otherwise have problems that are to be resolved.

For example, even in a network of only a few dozen devices, the number of interconnections may number well into the hundreds. Ensuring that the connection to every network device has been installed according to the rigid definition requires significant effort on the part of operating personnel. The effort required in the rigid definition approach to set-up the network and determine the resulting interconnections also often requires using more highly skilled personnel than would typically be desired. Therefore, it would be advantageous to have techniques for minimizing personnel resources, both in terms of the number of persons needed and the skill level required, to establish and verify the configuration of a network.

Furthermore, because of the inevitability of human error, merely having personnel repeatedly check the work done against the rigid network definition is often not effective in identifying a sufficient number of the problems with the network configuration. Inevitably some problems will escape even the most careful inspection by qualified personnel. Therefore, it would be advantageous to have techniques that reduce the opportunity for human error in determining the interconnections among network devices.

Another approach for determining the interconnections among the devices of a network is to provide no definition or framework for connecting the network devices. The no definition approach means that no structure or guidance is followed in connecting the network devices. Again, such an approach may work well for a small number of devices and interconnections where operators are able to determine which devices are connected over which connections on an as needed basis. And the no definition approach may save resources in the initial configuration of the network since there is no definition or plan is to be followed.

However, as the number of devices, the types of devices, the number of connections and the types of connections all increase, the effectiveness of the no definition approach decreases. It becomes increasingly difficult to sort out the network topography from the complex configuration that results from not following any plan to establish the interconnections among the network devices. Therefore, it would be advantageous to have techniques that provide direction to personnel as to how to create and verify the configuration of a network.

Based on the foregoing, there is a clear need for improved techniques for determining the interconnections among network devices.

SUMMARY OF THE INVENTION

The foregoing needs, and other needs that will become apparent for the following description, are achieved in the present invention, which comprises, in one aspect, a method for determining interconnections of network devices. The interconnections among the network devices may be uncertain or unknown. The network devices are connected together based on a set of general guidelines. A first network device has an associated power state that is changed. A second network device is monitored to identify whether an alteration occurs at the second network device in response to the change in power state of the first network device. When the alteration occurs at the second network device, information is created and stored that represents a logical connection of the first network device to the second network device. The changing of the power state of the first network device may be in response to a third network device and may be performed via a power controller. The alteration at the second network device may be a link becoming hot or the raising of a trap that is set at a switch. Errors are identified by comparing whether an alteration is identified at the second network device to information in a database that represents whether there is a logical connection between the first and second network device. Different types of interconnections may be determined in a series of phases by testing different types of devices in a specified order.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for determining interconnections of network devices is described. In the following description, for the purposes of explanation, numerous specific details are set forth in order to provide a thorough understanding of the present invention. It will be apparent, however, to one skilled in the art that the present invention may be practiced without the specific details. In other instances, well-known structures and devices are shown in block diagram form in order to avoid unnecessarily obscuring the present invention.

Figure 1:
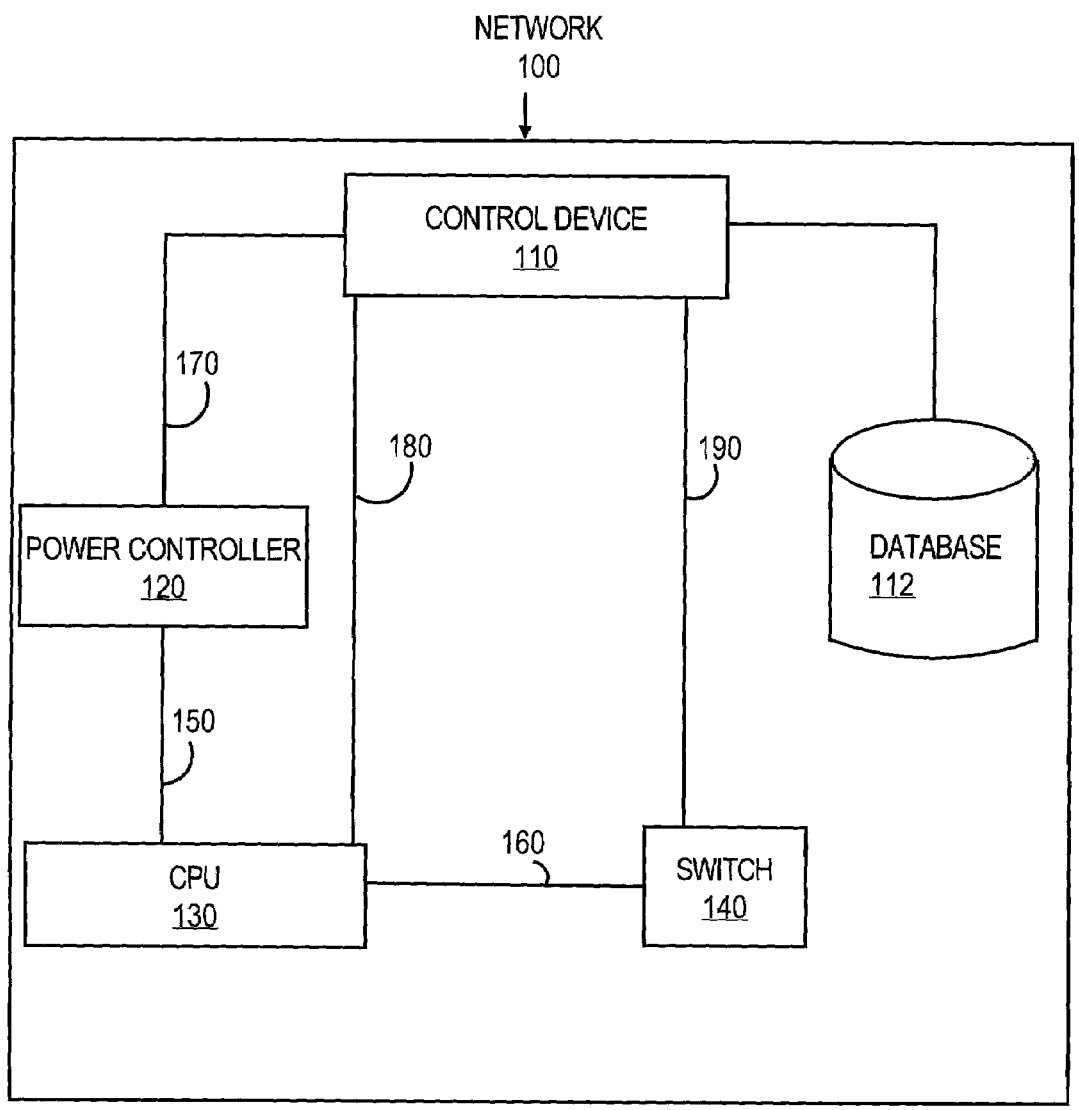
FIG. 1 is a logical block diagram that illustrates a high level overview of one embodiment of an apparatus for determining the interconnections of network devices.

In the following description, the various functions are discussed under topic headings that appear in the following order:

I. OVERVIEW
II. NETWORK WIRING GUIDELINES
III. POWER CYCLING
IV. ALTERATIONS AT OTHER NETWORK DEVICES
V. Identifying and Resolving Errors
VI. EXAMPLE OF A NETWORK FOR ILLUSTRATING THE DETERMINATION OF INTERCONNECTIONS
VII. MULTIPLE PHASE APPROACH TO DETERMINING INTERCONNECTIONS
VIII. EXAMPLE OF MULTIPLE PHASE TESTING
IX. ASSUMPTIONS
X. MANUAL CHECKS AND PHASES
XI. COMPARISON TESTING TO IDENTIFY CHANGES
XII. HARDWARE OVERVIEW I. Overview FIG. 1 is a logical block diagram that illustrates a high level overview of one embodiment of an apparatus for determining the interconnections of network devices. For the purposes of the functional overview provided herein, FIG. 1 is greatly simplified, and an actual network would comprise a large number of network devices, types of network devices, and interconnections. Furthermore, the particular devices in the example provided herein represent only a small selection from the many types of devices that are available, and more than one of each available type of device may be used in an actual network.

FIG. 1 shows a network 100 that is comprised of four network devices: a control device 110, a power controller 120, a CPU 130, and a switch 140. Control device 110 is connected to a database 112 that may be located on the same physical device as control device 110 or on another, separate device. Database 112 may contain information relating to the network devices and their interconnections. The information in database 112 may be obtained from many sources, such as the initial installation of the equipment, user input, or the results of the efforts performed to determine the interconnections among the network devices, as described herein.

Network 100 is also comprised of five network communication paths, or interconnections, each of which connects two devices as follows: an interconnection 150 between power controller 120 and CPU 130; an interconnection 160 between CPU 130 and switch 140; an interconnection 170 between control device 110 and power controller 120; an interconnection 180 between control device 110 and CPU 130; and an interconnection 190 between control device 110 and switch 140.

Also, each interconnection may be any one of a number of types of interconnections, such as power connections, serial connections, Ethernet, or fiber. For example, in FIG. 1, interconnections 170, 180, 190 may be serial connections that allow control device 110 to communicate with power controller 120, CPU 130, and switch 140, respectively. Also, interconnection 150 may be a power connection to provide power to CPU 130 via a power port on power controller 120, and interconnection 160 may be an Ethernet connection between CPU 130 and switch 140.

Figure 2:
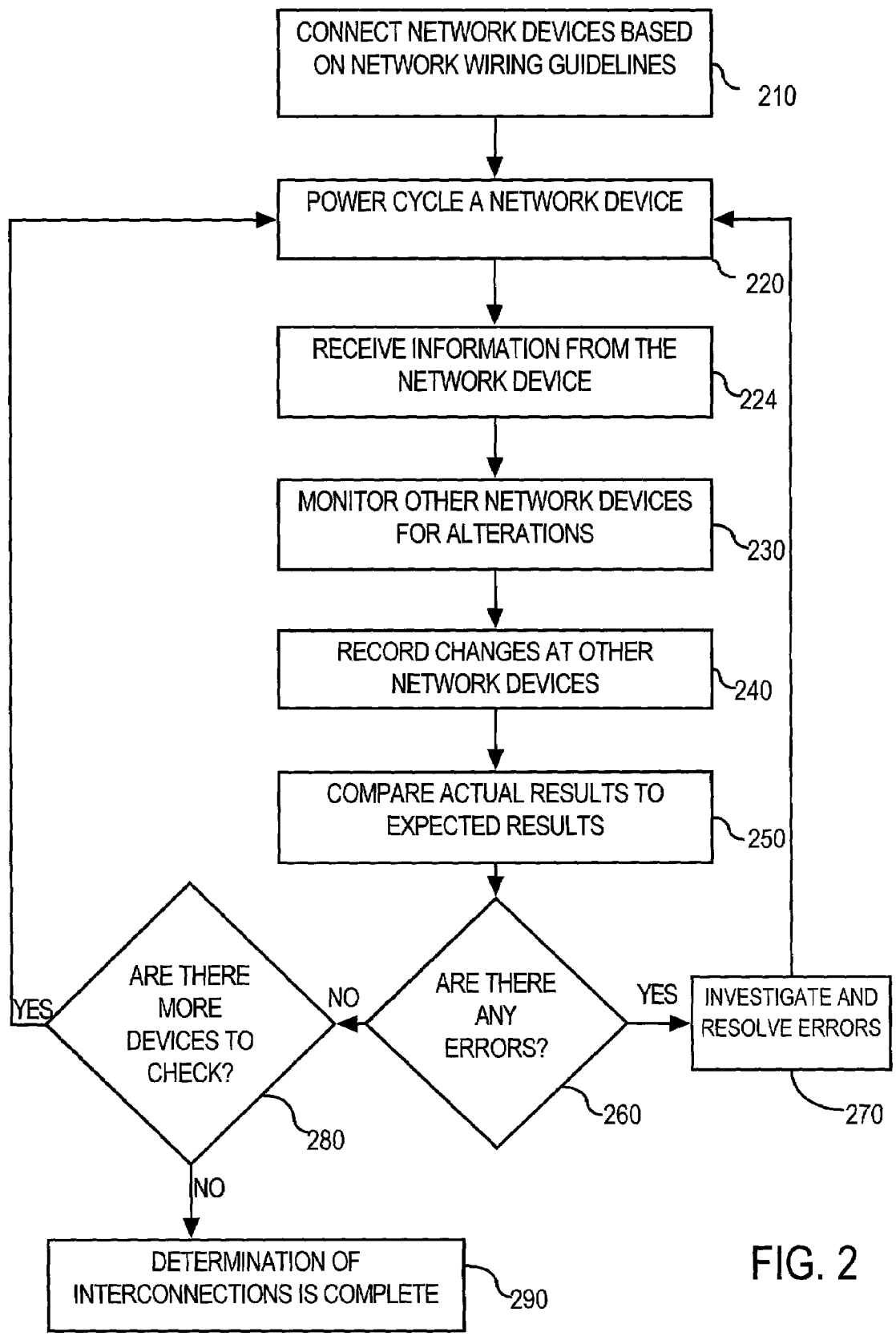
FIG. 2 is a flowchart that illustrates a high level overview of one embodiment of a method for determining the interconnections of network devices.

FIG. 2 is a flowchart that illustrates a high level overview of one embodiment of a method for determining the interconnections of network devices. The network devices are connected together based upon network wiring guidelines, as shown in block 210. The network wiring guidelines are set of general rules or instructions for connecting network devices together. The use of general guidelines, instead of a highly detailed specification, provides a basic framework for the initial network configuration that may be easily verified by a technician.

The network wiring guidelines may specify how many devices may be connected to a power controller or the type of connection to be used between two particular types of devices. For example, the guidelines may specify that for network 100 in FIG. 1, power controller 120 may be configured to control only one other network device. Thus, in FIG. 1, power controller 120 may be configured to control only CPU 130 via interconnection 150, and therefore interconnection 170 between power controller 120 and control device 110 may not be a power connection. Thus, interconnection 170 may be a serial connection that allows control device 110 and power controller 120 to communicate.

Next, the power state of a device is changed, as indicated in block 220. For example, in FIG. 1, the initial power state of CPU 130 may be unpowered (or "off"), but then power is supplied to CPU 130 (e.g., CPU 130 is turned on). The changing of a power state may be referred to as "power cycling." However, that term is used herein in a broader sense to also include turning off a network device or even to change the power state of a network device from standby to active.

In network 100, CPU 130 may be power cycled if control device 110 sends an appropriate signal over interconnection 170 to power controller 120. In response to the signal, power controller 120 energizes or powers up CPU 130 by providing power via interconnection 150.

Changing the power state of a network device also may provide additional information from that particular network device, as indicated in block 224. For example, in FIG. 1, turning on CPU 130 may result in CPU 130 providing a unique hardware identifier or number, such as its MAC (media access control) address. The identifier may be communicated to control device 110 via interconnection 180 and then recorded in database 112.

In response to the power cycling of a network device, other network devices are monitored for changes or alterations, as shown in block 230. A change or alteration at another network device indicates that there is a connection between the network device that is power cycled and the network device exhibiting the change or alteration. Conversely, the lack of a change or alteration at a particular device in response to the power cycling of another network device indicates that the particular device is not connected to the particular device.

For example, in FIG. 1, control device 110 may look for an alteration at switch 140. Specifically, control device 110 may monitor switch 140 to see if a trap is raised on a port of switch 140 in response to the power cycling of CPU 130. If a trap is raised on a port of switch 140, that indicates that switch 140 is connected to CPU 130, such as by interconnection 160. Raising a trap may also indicate the port on switch 140 to which interconnection 160 is physically connected.

The types of changes or alterations that may be detected are not limited to looking for the raising of traps on a switch. For example, a link between the network device that is power cycled and another device may be checked to see if the link becomes "hot," which indicates that the network connectivity to the power cycled device becomes active. If the link remains "dead" or inactive, then that may indicate a potential problem.

For example, the problem may be that the power cycled device did not power up or that the power cycled device is not connected to the other device. If the two devices are indeed connected, then the problem may be that there is a physical malfunction with that connection, such as a broken wire or a loose connection.

After power cycling a particular network device and looking for alterations at other network devices, the results may be recorded, as shown in block 240. For example, in FIG. 1, control device 110 may update database 112 to show that CPU 130 is connected to switch 140 because switch 140 raised a trap in response to the power cycling of CPU 130.

The results recorded in block 240 may be compared to other information to verify if the results were expected to occur, as shown in block 250. The testing of the connections from the network device that is power cycled to other network devices identifies the actual, installed connections. The actual, installed connections may be different than the desired or planned connections when the network devices were installed into the network. Information regarding the desired or planned connections may be included in a database.

Alternatively, the desired connections, as shown in a database, may be in error while the actual connections are correct. While the connections or links between network devices may be unknown, the connections may also be just uncertain, suspect, or indefinite until the testing of the connections or links determines the actual network configuration.

For example, in FIG. 1, control device 110 may retrieve information from database 112 regarding the connections for CPU 130. The retrieved information may be general information. For example, the retrieved information may be based on network wiring guidelines that specify that each CPU shall be connected to at least one power controller or that specify that no CPU's shall be connected to any switches.

Alternatively, the information retrieved from database 112 may be more specific, such as information obtained from other testing or from the original network configuration. For example, the information may specify that switch 140 is connected to the wire for interconnection 160, although the information may not specify to which port on switch 140 that particular wire for interconnection 160 is connected.

The results of the comparison are examined to determine if there is an error, as shown in decision block 260. For example, if the information from database 112 indicated that each CPU was to be connected to at least one switch and if the results of power cycling CPU 130 showed that CPU 130 was connected to switch 140, then there would be no error in the logical configuration of the network. However, if the information from database 112 indicated that no CPU's were to be connected to a switch, but the results of power cycling CPU 130 showed that CPU 130 was connected to switch 140, then that mismatch indicates that there is an error in the logical network configuration.

Alternatively, the results of the comparison may show a problem with the physical connections instead of just the logical connections. For example, assume that no trap was raised on switch 140 when CPU 130 was power cycled, indicating that there is no connection between the two network devices. Also assume that the information in database 112 indicates that there is indeed a connection between CPU 130 and switch 140. The mismatch between the results of the power cycling of CPU 130 and the database information then indicates that there is an error in the physical interconnection. For example, there might be a broken wire or a loose connection of the wire to one or both of the network devices.

If there is an error, then the error needs to be investigated and resolved, as shown in block 270. Typically, investigation and resolution would be a manual process by a technician who would inspect the suspect connection and the database information to determine the source of the problem. If the error lies in the logical network configuration, then a configuration change may be necessary to resolve the problem. For example, the existing connection between CPU 130 and switch 140 may have been made in error and thus interconnection 160 should be removed.

If the error is in the physical connection, then the problem is likely to be found by the technician upon inspection of the connection and easily resolved. For example, a broken wire may be replaced, or a loose connection may be tightened.

Alternatively, the error may lie in the information in the database. Therefore, resolution of the problem may involve correcting that information in the database via an operator entry at a terminal.

After the error is resolved in block 270, the power cycling of block 220 is repeated to verify that there are no other errors with that particular network device.

Returning to block 260, if no error is identified, then a check is made to see if other network devices still need to be power cycled to determine their interconnections, as shown in block 280. If there are more devices to check, then the power cycling of block 220 is repeated for the next network device. If there are no more network devices to check, then in the example shown in FIG. 2, the determination of the interconnections among network devices is complete, as shown in block 290.

In one embodiment, the process of FIG. 2 is implemented in the form of one or more computer programs that are executed by a device that may apply power to network devices and monitor network devices, e.g., control device 110 of FIG. 1.

The approach described herein allows the network devices themselves to be used to determine the interconnections among the network devices in an automated fashion. The apparatus and method described also allow for efficient and accurate identification of any errors that are to be resolved and greatly reduces the need for technicians to manually trace each connection. Furthermore, the approach described herein reduces the concern about human error that arises from using manually verifications, which are not sufficiently effective in identifying problems in complex networks, such as server farms.

In addition, the knowledge obtained by performing the actions above includes not only the logical connections among the device, such as that CPU 130 is connected to switch 140 in the example above, but also details about the physical connections, such as that CPU 130 is connected to port A on switch 140. Obtaining information about the physical connections provides a more complete picture of the existing network configuration without having to specify and verify such details when initially establishing the interconnections or having to make manual inspections of all of the connections.

II. Network Wiring Guidelines

In order to address problems associated with the prescriptive or rigid specification approach for establishing the network configuration and with the no specification approach, an intermediate approach may be employed to provide general guidance to the technicians when establishing the network.

In one embodiment, a set of general rules, or "network wiring guidelines," are used to establish the initial configuration of the network. The network wiring guidelines represent an intermediate level of specificity as compared to the prescriptive specification and no specification approaches described previously. For example, the network wiring guidelines may specify that each router has one fast Ethernet connection to each core switch. In contrast, a prescriptive specification may dictate that a particular router is connected to a particular core switch via specified ports on each device. With a no specification approach, there is no guidance, and therefore the router may be connected in any of number of ways, including having more than one fast Ethernet connection to each core switch.

As a result of the intermediate approach reflected in the network wiring guidelines, the technician connecting the network devices together has basic guidance as to how to make the necessary interconnections among network components. However, the technician is also not burdened with too much detail, which decreases the productivity of the technician, increases the opportunities for human error, and makes it more difficult to later determine the actual interconnections and resolve problems.

In other embodiments, various characteristics or aspects of the connections among network devices are used to determine which of the network wiring guidelines to apply or how to apply a particular guideline. The aspects of the connections may include the type of connection between the devices, such as whether the connection is a serial connection, a fast Ethernet connection, or a fiber connection.

The aspects of the connections may also include a specification of how many other devices to which a particular device may be connected. For example, the guidelines may specify that each core switch shall have both serial ports connected to the same terminal server. A terminal server allows an operator to use input and output devices, such as a keyboard and display monitor, for a network device that lacks such input and output devices and which may also be located well away from the input and output devices.

The aspects of the connections may also include specifying that certain types of network devices shall be connected to other certain types of network devices. For example, the guidelines may specify that each router be connected to a terminal server.

The guidelines may also provide for other rules or instructions based upon the connections that are made. The instructions may limit the way in which network devices may be linked together. For example, the guidelines may specify that each access switch shall not be linked to a power controller by both Ethernet and power, or that an ignition power controller not control another power controller.

Additional examples of network wiring guidelines are set forth in Table 1 below.

TABLE 1

A. ROUTER

1. Each router has one fast Ethernet connection to each core switch. Each router has one fast Ethernet connection to each core switch.
2. Each router has one external fast Ethernet connection.
3. The power in must be connected to a power controller.
4. Each router must be connected to a terminal server.

B. CORE SWITCH

1. All core switches are inter-linked with two fiber connections.
2. Core switches are connected to all the routers using fast Ethernet.
3. Core switches are connected to each access switch by two fibers.
4. The power inputs must be connected to separate ignition power controllers.
5. Each core switch must be connected to a terminal server, both serial ports to the same terminal server.
6. All Cisco equipment must be connected to the first terminal server TABLE 1-continued

C. ACCESS SWITCH

1. Each access switch is connected by two fiber connections to each core switch.
2. Access switches are connected to other grid equipment via fast Ethernet or fiber as appropriate.
3. The power inputs must be connected to separate ignition power controllers.
4. An access switch must not be connected to power controller by both Ethernet and power.
5. Each access switch must be connected to a terminal server, both serial ports to the same terminal server.

D. IGNITION TERMINAL SERVER

1. The ignition terminal server must be connected to a power controller.
2. The first fast Ethernet port (eth0) is connected to an access switch in the 10.2 network.
3. The second Ethernet port (eth1) must be connected via the network operations center (NOC) hub to the external 10.1 network.
4. The ignition terminal server must be connected via the serial port to both of the control plane database (CPDB) machines.
5. The ignition terminal server must be connected via the serial port to the primary rack power controllers.
6. The ignition terminal server must be connected via the serial port to the core and access switches.
7. The ignition terminal server must be connected via the serial port to both of the routers.
8. The ignition terminal server must not control a power controller that is used to power the ignition terminal server.

E. GENERAL TERMINAL SERVER

1. The general terminal server must be connected to a power controller.
2. The general terminal server must be connected to an access switch via the first fast Ethernet port (eth0).
3. The general terminal server must be connected via the serial port to the load balancers.
4. The general terminal server must be connected via the serial port to the firewall machines.
5. Any additional control plane machines must be connected via the serial port to a terminal server.
6. General terminal servers should be connected back (directly or indirectly) via the serial port to the ignition terminal server.
7. General terminal servers must not control a power controller that is used to power the general terminal server.
8. All equipment that has a console connection must be connected to a terminal server.

F. IGNITION POWER CONTROLLER

1. An ignition power controller must not control another power controller (including itself).
2. An ignition power controller must be connected to a terminal server.
3. An ignition power controller must be connected to the external NOC hub by its Ethernet port.

G. GENERAL POWER CONTROLLER

1. A power controller must not control another power controller (including itself).
2. A power controller must be connected to a terminal server.
3. A power controller must be connected to an access switch by its Ethernet port.

H. CONTROL PLANE (CP) SERVER

1. The 1 GB Ethernet must be connected to an access switch.
2. A CP server must be connected to a power controller.
3. A CP server must be connected to a terminal server.
4. The Fiber channel must be connected to a Fiber Channel Switch.
5. The Fast Ethernet is connected to the same access switch as the 1 GB Ethernet.
6. CP servers should be balanced across access switches.

I. CONTROL PLANE DATABASE (CPDB)

1. The 1 GB Ethernet (alt0) must be connected to a core switch and in the 10.2 network.
2. The fast Ethernet must be connected to the same core switch (hme0).
3. The first quad fast Ethernet port must be connected to a separate core switch (qfe0 or hme1 if using multiple fast Ethernet cards).
4. The second quad fast Ethernet port (qfe1 or hme2) must be connected to the external connection that leads to the NOC. This is normally a hub and is the 10.1 network.
5. The $3^{rd}$ and $4^{th}$ quad fast Ethernet ports are not connected.
6. The CPDB must be connected to an ignition terminal server.
7. The CPDB must be connected to an ignition power controller.
8. The Fiber ports must be connected to the host layer of different front-end storage area networks (SAN's).

J. STORAGE MANAGEMENT DEVICE

1. The 1 GB Ethernet must be connected to an access switch.
2. The fast Ethernet port must be connected to and access switch.
3. One of the quad fast Ethernet connections must be made to the same access switch.
4. The remaining three quad fast Ethernet connections are not connected.
5. The two fiber channel connections must be made to different back-end SAN's.
6. The storage management device must be connected to a terminal server.
7. The storage management device must be connected to a power controller.

H. FRONT-END PROCESSOR (FEP)

1. The FEP must be connected to a power controller.
2. The fast Ethernet ports are connected to the same access switch.
3. The FEP must be connected via its fiber port to a fiber channel switch.

I. NETWORK FILE SYSTEM/COMMON INTERNET FILE SYSTEM (NFS/CIFS)

1. The NFS/CIFS must be connected to a power controller.
2. The NFS/CIFS must be connected to a terminal server.
3. The fast Ethernet and 1 GB Ethernet ports are connected to the same access switch.
4. The NFS/CIFS must be connected via its fiber port to a fiber channel switch.

J. CUSTOMER CPU

1. The Customer CPU must be connected to a power controller.
2. The Customer CPU must be connected to a terminal server.
3. The fast Ethernet and 1 GB Ethernet ports are connected to the same access switch.
4. The Customer CPU must be connected via its fiber port to a fiber channel switch.

K. MEDIA SERVER

1. The media server must be connected to a power controller.
2. The media server must be connected to a terminal server.
3. The media servers are clustered provide failover.
4. The media servers are distributed between the back-end SAN's.

L. x86 FEP

1. Both Ethernet ports are connected to the same access switch.
2. The power connection must be made to a power controller.

M. x86 SITESCOPE

1. Both Ethernet ports are connected to the same access switch.
2. The power connection must be made to a power controller.

N. x86 GHOST SERVER

1. Both Ethernet ports are connected to the same access switch.
2. The power connection must be made to a power controller.

O. LOAD BALANCER

1. The Load Balancer must be connected to a power controller.
2. The Load Balancer must be connected to a terminal server.
3. The fast Ethernet ports are connected to the same access switch. These must be cross-over cables rather than standard cables.

P. FIREWALL

1. The Firewall must be connected to a power controller.
2. The Firewall must be connected to a terminal server.
3. The three fast Ethernet ports are connected to the same access switch.

TABLE 1-continued

Q. FIBER CHANNEL SWITCH
  1. The fiber channel switch must be connected to an access switch via its fast Ethernet port.
  2. The power connectors must be connected to separate power controls.
  3. No more than seven hops are allowed for cascading switches.
R. STORAGE DEVICE
  1. The storage device is connected to power not using a power controller.
  2. The storage device is connected to a fiber channel switch using fiber.
S. CO-LOCATION (Co-Lo) HUB
  1. The hub must not be connected to a power controller. It must be continuously powered.
  2. The external connection must be made to the Co-Lo.
  3. Appropriate internal connections must be made to the routers. See specific rules for routers for more information.
T. NETWORK OPERATIONS CENTER (NOC) HUB
  1. The hub must not be connected to a power controller. It must be continuously powered.
  2. The external connection must be made to the NOC. This is the 10.1 network.
  3. Appropriate internal connections must be made to the ignition terminal server, ignition power controllers, CPDB1 and CPDB2.

III. Power Cycling

In one embodiment, power cycling of network devices is used to determine interconnections among the network devices. The "power cycling" of a network device means that the power state of the network device is changed or altered from what the power state was immediately prior to the power cycling action. The power state of a network device before power cycling may simply be "off," unpowered, or inactive, or "on," powered, or active. The power state of a network device may also be any other power characteristic of the network device. For example, the power state may be a form of power conservation mode, such as a power saving or "sleep" state, in which only minimal power is used by the network device.

When a network device is power cycled, its initial power state is changed to a new or final power state. For example, a network device that was initially off may be turned on, or vice versa. Alternatively, a device that initially was in a power saving sleep mode may be changed to an active state, or vice versa.

The act of power cycling a device may be accomplished in many ways. In one embodiment, the power state of the network device is manually altered. For example, a CPU that was initially off may be switched on via the CPU's power switch by a technician.

In another embodiment, the power state of a network device is altered by issuing a command or signal via the network to equipment connected to the network device. The signal may be sent by another device in the network, such as a control device. Generally, the control device may be any network device within the network, although typically the control device will be part of the control plane of the network. For example, the control device may be a control plane database (CPDB) machine. Alternatively, the control device may be a storage management machine, which may be particularly useful for determining the fiber connections within the storage network portion of the network.

The equipment that receives the signal from the control device may be a relay that is connected to the network device. Upon receipt of the signal from the control device, the relay will turn on or off the network device.

In yet another embodiment, power controllers are used to receive and act upon the signals sent by the control device. For example, a particular power controller has a number of power ports, each of which is connected to a relay, and each relay is connected to a network device. Upon receipt of an instruction from a control device to change the power state of a network device, the power controller energizes (or de-energizes, as appropriate) the relay on the port that is connected to the desired network device. An example of such a power controller is the AP 9606 model manufactured by American Power Conversion (APC).

A power controller may be directed in several ways. The power controller may receive signals via a serial connection. The power controller may be controlled by a web page. The power controller may be controlled via simplified network management protocol (SNMP) commands.

Most types of network devices may be connected to relays and power controllers to facilitate remote activation. However, not all network devices may be controlled via relays and power controllers, such as the power controllers themselves. Also, a typical network wiring guideline is that a power controller cannot be connected to another network device that controls the power controller. Otherwise an infinite loop would be formed between the devices so connected and none could be activated.

Power cycling of a network device may also provide additional information about the device itself. For example, when a CPU is turned on, the CPU will typically provide a unique hardware identifier or number, such as its MAC address. The additional information obtained from power cycling the network device may then be added to the database by the control device.

In addition, some devices have multiple interfaces that may be identified by their MAC addresses just as the network device itself is identified. By checking the vendor portion of the MAC address against the IEEE assigned vendor codes, the interfaces may be identified. For example, a CPU may have two interfaces. If two different interfaces are used in each CPU, such as both an Intel and a 3Com interface, then the different interfaces may be identified by their vendor codes of their respective MAC addresses. By knowing which port the MAC address was received from, the port for a given connection may also be identified.

In addition, for some manufacturers, there may be only one MAC address for all types of network devices. If there is only one MAC address, the vendor codes may be changed to other codes that do not conflict with other network devices so as to provide unique identifiers for each type of device from such a manufacturer.

Furthermore, programs may be executed on a network device to obtain more information than that automatically provided by the device at boot up for via the other interactions discussed above. For example, for a CPU, an executable may be run to obtain the hardware configuration of that CPU, such as the amount of memory the CPU has, the processor type and speed, and so on.

The approach described herein allows power controllers and relays to remotely direct power to be supplied (or not be supplied) to the specified network devices, which in turn permits an automated approach to determining the interconnections among network devices. Such an automated approach, as described more fully below, provides for a fast and efficient determination of interconnections while significantly reducing personnel resources that otherwise would be needed.

IV. Alterations at Other Network Devices

Power cycling of a network device is useful because power cycling causes changes or alterations at other network devices that may be detected. Such changes or alterations allow the network operator to verify the existence of a connection or lack thereof. The changes or alterations at other network devices include, but are not limited to, whether a link to another network device is "hot" or active, whether a trap set at a switch is raised, and any other similar type of change that is detectable by a control device.

In one embodiment, network devices are powered up to determine serial connections, such as console connections. When each network device is powered up, the actual console connections may be identified by checking each port in turn on each terminal server. For example, the status of a particular port on a specific terminal server may not be hot or active prior to powering up the network device. If, after power cycling the network device, the port is hot, then that would indicate the network device is connected to the specific terminal server on the particular port.

In another embodiment, network devices are powered up to determine Ethernet connections. For example, when each network device is powered up, the Ethernet connections may be identified by setting a trap on a Cisco 6500-class switch and then checking to see if the trap is raised in response to the change in link status from "dead" to "hot." A similar procedure may be used for other types of switches from either Cisco or other switch manufacturers. Because a trap is set on a particular switch prior to power cycling the network device, only the particular switch needs to be polled to see if a trap was raised instead of all switches in the network.

For example, a trap may be set on a switch using a command such as:

set port trap <range> enable wherein

<range>=<blade> "/" <port-range>
    <port-range>=<port> "-" <port>

For example, the command:

set port trap 3/1-48 enable would cause a trap to be set for any change of status of ports 1 through 48 on blade 3 of the specified switch.

In addition, the SNMP (simple network management protocol) trap receiver is set with the command:

set snmp trap <target-address> where <target-address> is the appropriate resolvable name or IP (Internet protocol) address. The SNMP trap receiver will therefore receive the raised traps that are set with the first command above.

In another embodiment, an IP address for a network device may be used to determine the port of the switch to which the network device is attached. For example, by sending traffic to the specific IP address of the network device, the MAC address of the network device will be associated with a port on the switch to which the network device is attached. The port details for the MAC address may be identified by using two different standard MIB's (management information base objects), such as on a Cisco switch. The first MIB is the "bridge" MIB that allows a MAC address to be mapped to an internal port number. The second MIB allows the internal port number to be mapped to a standard port name.

For example, for a Cisco switch, a MAC address in hexadecimal values of aa:bb:cc:dd:ee:ff may be translated into a string of decimal values U.v.w.x.Y.Z. The latter may be associated to the relevant internal port representation by performing an SNMP "get" request on the following expression:

A=BridgeMIB.dot1dBridge.dot1dStatic.StaticTable.
    (cont) ReceivePort.U.V.W.X.Y.Z Once a value for "A" is determined, the value may be converted to a physical port address by performing an SNMP "get" on the following expression:

Port IfMIB.ifMIBobjects.ifXTable.ifXEntry.ifName.A

Thus, given a MAC address, the port may be determined.

The approach described above allows for identification of alternations at other network devices in response to the power cycling of a particular network device, which in turn permits an automated approach to determining the interconnections among network devices. By using such an automated "testing" approach, the interconnections among the network devices are determined quickly and efficiently without the need for significant personnel resources to trace and verify each connection.

V. Identifying and Resolving Errors

The results from detecting alterations at a network device due to power cycling of another network device may be compared to other information to identify a problem or error. The other information may come from a number of sources, such as the network wiring guidelines or a database, such as database 112 in FIG. 1. An error is resolved by investigating the cause of the error, which typically involves a manual investigation by a technician of the suspect connection and the other information. The database may be any collection of data that is organized so that its contents may easily be accessed, managed, and updated. The database may be organized by using one or more rows or columns, a variety of different fields, one or more tables, linked lists, or stacks, one or more spreadsheets, one or more relational databases, or any combination thereof.

Generally, an error will arise due to one of three basic problems: an error in the logical connection, an error in the information being compared with the power cycling results, or an error in the physical connection. Errors in the logical connection may include establishing an interconnection between the wrong network devices. Errors in the information being compared with the power cycling results may include a data input error by a technician in making entries to the database corresponding to the initial set-up of the network. Errors in the physical connection may include a broken wire or a loose connection at a network device.

In one embodiment, the results of the power cycling and alteration detection are compared to network wiring guidelines that are used in establishing the initial network configuration. For example, the network wiring guidelines may specify that a switch shall have two power connections, two terminal server connections, and one or more network connections. The comparison of the test results to the guidelines may be made early in the overall testing process, such as after the network devices are checked-in and installed in the network. By performing such an initial check, any easily identifiable errors, like the number and type of connections, may be found and then resolved.

In another embodiment, the vendor portion of the MAC address, which is provided by a network device when the network device is powered up, is checked. For each type of device, there may be a list of permitted vendor codes. If the vendor portion of the MAC address does not match a code on the list of permitted vendor codes for the particular type of network device that was powered up, then an error will be raised. The MAC address for the powered up network device, along with any other information provided by the device, may also be recorded in a database, such database 112 in FIG. 1.

In yet another embodiment, the results of the power cycling and alteration detection are compared to other information, such as that contained in database 112 of FIG. 1. The database may contain the results of other checks, such as the information provided by a device when the device is powered up or the results of the determination of other interconnections. The database may also contain information provided by the technician who incorporated the network device into the network. For example, after installing a network device, the technician may record which power controller to which the network device has been attached.

Also, the database may contain information gathered when a network device is initially received and inventoried prior to being installed in the network. For example, the inventory information may include the type of network device, the MAC address for the network device, and the IP address (if assigned) for the network device.

All of the checks and verifications described above may be implemented within the control system for the network, although manual checks may be made if desired. For example, referring to FIG. 1, control device 110, in addition to sending signals to power cycle devices and monitoring other devices for alterations, may record the results of the testing and then compare those results to the other sources of information described above. Also, control device 110 may then alert the operators of the network of any errors that are identified in a variety of ways, such as by showing the errors on a display or by printing out a listing or report of the errors.

Resolution of any identified errors will typically involve an investigation and subsequent corrective action by a technician. For example, if the error is in the logical connection, the technician may reroute the problem connection. If the error is in the database used to compare the test results to, then a database change may be made. If the error is in the physical connection, then a repair of that connection may be made, such as by replacing a broken wire are securing a loose hardware connection.

The approach described herein allows for an efficient and accurate identification of errors in the interconnections among the network devices. By performing checks against more than one source of information or perhaps even all information sources, more problems and inconsistencies among those sources of information may be identified. In addition, as more connections are checked and problems are resolved, the amount of knowledge obtained about the network interconnections grows, which may then be used to check subsequent network connections.

In addition, the comparisons between the results and other information may be incorporated into the automated testing along with the approaches for power cycling and detecting alterations described above. By automating the comparisons, a network based automated interconnection testing approach may quickly and accurately test connections and report results to the network operators. An automated testing approach helps to reduce the personnel resources needed, both in terms of the number of personnel needed and the skills necessary, to inspect network connections and identify problems.

VI. Example of a Network for Illustrating the Determination of Interconnections

Figure 3:
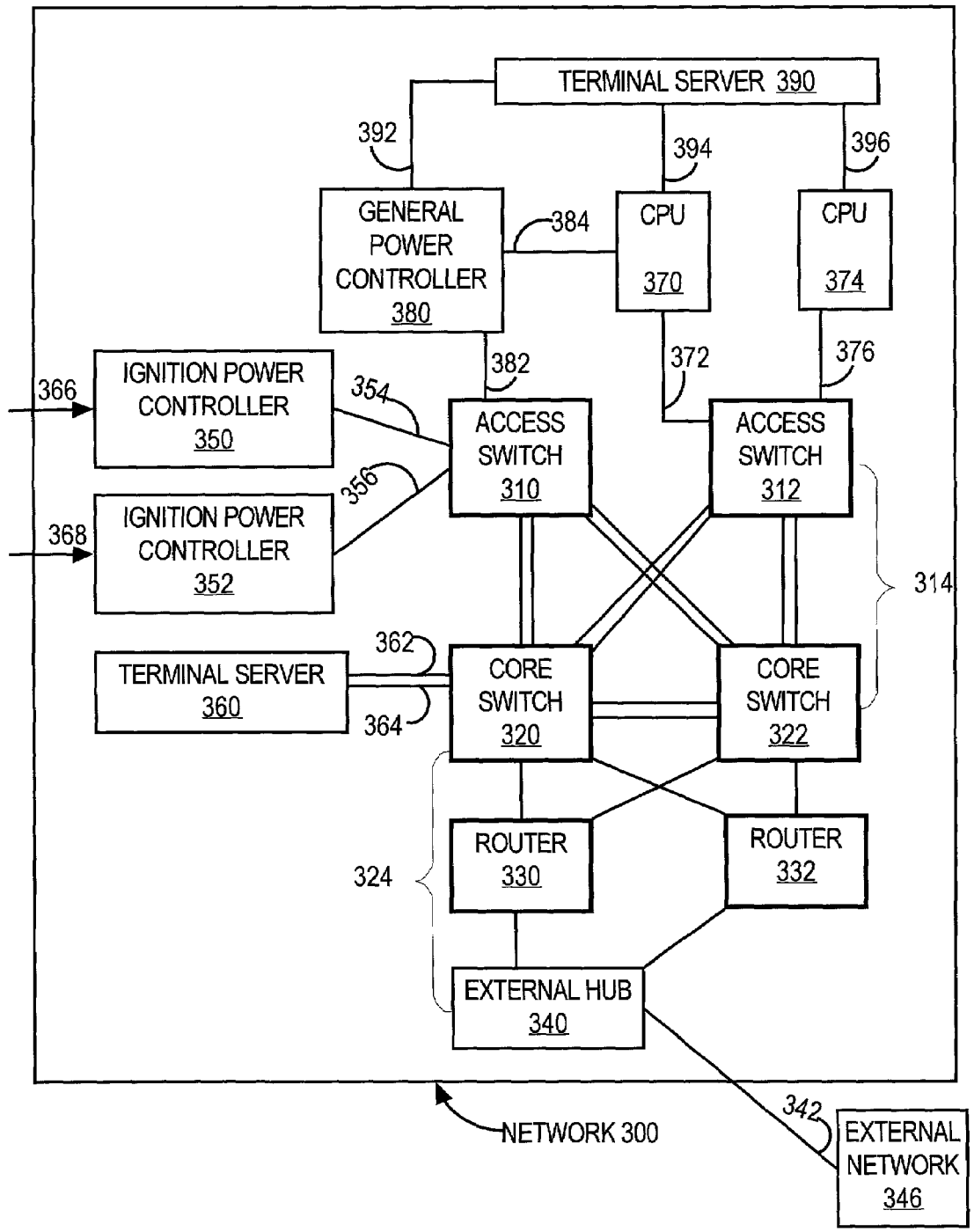
FIG. 3 is a logical block diagram that illustrates a simplified network to which one embodiment of a method for determining the interconnections among network devices may be applied.

FIG. 3 is a logical block diagram that illustrates a simplified network to which one embodiment of a method for determining the interconnections among network devices may be applied. FIG. 3 is a simplified example of an actual network. In particular, FIG. 3 only shows representative connections and devices, such as an example of two types of powers controllers, two terminal servers, and two access switches. In contrast, with an actual network, nearly every device will have connections to a power controller, terminal server, and a switch.

Furthermore, for clarity, the connections between each network device and the control device and an associated database (or control plane with an associated control plane database) of the illustrated network is not shown. Also, in the following description of the network devices and their interconnections, several examples of network wiring guidelines are provided. However, the following description only provides representative examples, and an actual network will typically employ numerous other guidelines and also guidelines that differ from those described herein.

In FIG. 3, a network 300 is shown that is comprised of a number of various network devices of several types and of a number of various connections of several types. The following network devices represent the basic "switch fabric" for the network: access switches 310, 312, core switches 320, 322, and routers 330, 332. In the example of FIG. 3, access switches 310, 312 and core switches 320, 322 are connected to each other by a set of double fiber connections 314. The specification that such connections are to be double fiber is an example of one of the network wiring guidelines discussed previously. There may also be a network wiring guidelines that specifies a double fiber connection between core switch 320 and core switch 322. Fiber connections may be implemented using host bust adaptors such as those manufactured by JNI Corporation Also, core switches 320, 322 and routers 330, 332 are connected by a set of fast Ethernet connections 324. Again, the specification that core switches are to be connected to routers via fast Ethernet is another example of a network wiring guideline.

Network 300 also has an external hub 340 that is connected to an external network 346 via an external fast Ethernet connection 342. External network will typically be the worldwide packet based network known as the Internet. The unlabeled connections from routers 330, 332 to an external hub 340 are also fast Ethernet, as might be specified in yet another network wiring guideline.

Network 300 also contains a terminal server 360 that is connected to core switch 320 via two serial connections 362, 364. Again, the specification that a core switch is to be connected to the same terminal via both of the core switch's serial ports may also be a network wiring guideline.

Network 300 also contains ignition power controllers 350, 352 that take power from external power connections 366, 368. In addition, ignition power controllers 350, 352 are connected to access switch 310 via power connections 354, 356. The providing of power to an access switch via power connections coming from separate ignition power controllers is also an example of a network wiring guideline.

Network 300 also contains CPU's 370, 374, which are connected to access switch 312 via faster Ethernet connections 372, 376, respectively. The network wiring guidelines may include a specification that each CPU be connected to an access switch via a fast Ethernet connection.

A general power controller 380 is shown in network 300. General power controller 380 has a power connection 384 to CPU 370 and an Ethernet connection 382 to access switch 310. The specification that each CPU have a power connection to a power controller, and that a power controller have an Ethernet connection to an access switch via the power controller's Ethernet port are examples of network wiring guidelines.

Finally, network 300 contains a terminal server 390 that has three connections as follows: a serial connection 392 to general power controller 380, a serial connection 394 to CPU 370, and a serial connection 396 to CPU 374. The connecting of each CPU and power controller to a terminal server via serial connections are examples of network wiring guidelines.

In determining the interconnections among the network devices, a typical approach is to change the power state of a particular device, such as by turning on the particular device, and then monitor another network device, or a set of network devices, for an alteration or change. If an alteration is detected, then that is an indication of a connection between the particular device and the other network device that has the alteration.

For example, assume that the connections for CPU 370 are to be checked. A control device (not shown) issues a signal to general power controller 380 to activate CPU 370, such as by turning on CPU 370. Assume also that a database associated with the control device indicates that CPU 370 has a serial connection to terminal server 390. After activating CPU 370, the control device may check the serial ports on terminal server 390 to determine if any are now "hot" or active as a result of the activation of CPU 370. Assume that a particular serial port on terminal server 390 has become hot as a result of power cycling CPU 370, thus indicating that there is a serial connection between CPU 370 and the particular serial port on terminal server 390.

The results of the check above for CPU 370 indicate that there is a logical connection between CPU 370 and terminal server 390. Further, the results of the check provide physical connection information, namely that serial connection 394 is connected to a particular port on terminal server 390. The additional information regarding the physical connection details may be added to the database that is associated with the control device.

As a result of power cycling CPU 370, other information may have been obtained about CPU 370. For example, CPU 370 may have sent out its MAC address, which may be received by the control device and added to the associated database, if that information is not already entered. Furthermore, if the MAC address for CPU 370 is already contained in the database, a check may be made against the MAC address stored therein and the MAC address sent by CPU 370 when CPU 370 is power cycled. Checking the stored MAC address against the MAC address sent by CPU 370 would verify that the database information is correct and that the correct CPU has been power cycled.

In addition to determining the terminal server connection for CPU 370 as a result of power cycling, other connections may be determined. For example, access switches 310 and 312 may be monitored to determine if either of them is connected to CPU 370. As discussed above, traps may be set at both access switches 310, 312. After power cycling CPU 370, the control device would see that a trap was raised only on access switch 312. The raised trap would therefore indicate an Ethernet connection between CPU 370 and access switch 312.

The results of the check above for CPU 370 indicate that there is a logical connection between CPU 370 and access switch 312. However, assume that the database associated with the control plane instead indicates that CPU 370 is connected to access switch 310. The mismatch between the results of the test and the database information would result in an error to be investigated and resolved by a technician.

The resolution of the error may have at least two possibilities. First, CPU 370 may have been connected to access switch 312 in error and instead should have been connected to access switch 310. Thus, resolution would involve the technician switching Ethernet connection 372 from access switch 312 to access switch 310.

The second possible result of investigating the error is that the connection is correct but that the information in the database is incorrect. Thus, resolution of such a database error would involve the technician correcting the information contained in the database that the control device accessed.

As another example, assume that the connections for core switch 320 are to be checked. As above, the control device sends a signal to power cycle (or turn on) core switch 320. The control device checks the database to learn that core switch 320 is connected to terminal server 360 via serial connections 362, 364. The determination of the serial connections and the associated port on terminal server 360 proceeds as described above for CPU 370 and its connection to terminal server 390.

However, assume that core switch 320 is to be connected to terminal server 360 via two serial connections. Also assume that the test shows only serial connection 362, not serial connection 364. The mismatch between the results of the test and the database information would result in an error to be investigated and resolved by a technician.

The resolution of the error may have at least two possibilities. First, core switch 320 may be connected to another terminal server via serial connection 364. However, assume that is not the case. Therefore, an investigation by the technician would likely reveal that there is a problem with the physical connection for serial connection 364, such as either a broken wire or a loose connection. Thus, resolution of the physical connection error may involve the technician replacing the broken wire or tightening the loose connection.

The network shown in FIG. 3 and the examples discussed above for determining the interconnections among the network devices are greatly simplified. Nevertheless, the examples illustrate the establishing of the initial network connections according to a set of network wiring guidelines and then using an automated testing approach to determine the interconnections among the network devices and to identify and resolve any errors that are identified. By using the general network wiring guidelines and the network based automated testing of the connections, an accurate and efficient determination of the logical and physical connections among the network devices is achieved.

VII. Multiple Phase Approach to Determining Interconnections

A multiple phase approach may be used for determining the interconnections among network devices, wherein each phase involves power cycling and identification of alterations at other network devices. By using a multiple phase approach, each phase may build upon the information determined in prior phases and thereby incrementally build a representation of the interconnections among the network devices.

In one embodiment, different types of connections are determined in separate phases. For example, the serial connections may be determined in one phase. The first phase may also be the determination of the serial connections because basic devices, such as switches, terminal servers, and power controllers, will typically have serial connections that may be accessed by a control device. Also, the basic devices are often used in determining the interconnections to other types of devices, as discussed above. Establishing that the basic serial connections among the basic devices are correct helps ensure that the connections among other types of connections and devices can be determined.

In another embodiment, the order of testing the network devices in a particular phase may be specified. For example, the order of testing the devices in a serial connection determination phase may be specified such that the more basic types of network devices are checked first. One such order may be as follows: power controllers, terminal servers, switches, routers, CPU's, load balancers, firewalls, fiber channel switches, disk arrays, and external hubs. The checking of devices that are more basic or fundamental in the network configuration allows for errors with such devices to be identified and resolved first. Then given that the interconnections for the basic devices are verified to be correct (or fixed if they are not), the interconnections for the other types of network devices may be determined.

Another phase may include ascertaining the Ethernet connectivity of the network. The Ethernet phase is likely to be the next type of connection checked after the serial connection phase because the Ethernet connections are more extensive and complex than serial connections, yet Ethernet involves some of the more common type of connections among the network devices.

Other phases may be used for other types of connections. For example, a separate phase may be used to determine the fiber connections among the network devices. Fiber connections may be used within the switch fabric of the network as well as with the storage devices in the network. The storage devices may be incorporate into the network using a combination of front-end storage area networks (SAN's) for interfacing with the network storage devices, disks or disk arrays for the storage function, back-end SAN's for backup purposes, and also tape libraries. An example of the disk arrays that may be incorporated into the network are those manufactured by EMC Corporation, such as the EMC Symmetrix disk arrays.

Each SAN may be comprised of a set of interconnected fiber channel switches organized into a series of tiers. For example, there may be a storage tier that interfaces directly with the disk arrays. There may also be a core tier that is fully meshed with the storage tier and the third tier, the host tier. The host tier interfaces with the network devices that use storage, such as media servers. An example of such media servers are Sun Media Servers manufactured by Sun Microsystems, Inc.

Another phase may be used to perform a rigid check against the network wiring guidelines. The previous discussion of the identification of errors explained that the results of checking for interconnections might be checked against the network wiring rules. However, as discussed above, such a check may be limited to just determining basic information, such as the number and types of connections.

In contrast, the "rigid wiring check" phase may include a very rigorous verification that the network devices have been properly connected per the network wiring guidelines. The prior checks may be characterized as "active" because of the power cycling of network devices and monitoring for alterations at other network devices. However, the rigid wiring check may be characterized as passive because there is no power cycling and monitoring involved. Instead, the rigid check may be performed by strictly applying the network wiring guidelines to the information that is recorded in a database as a result of all of the previous checks and phases.

During each phase, each network device may be given a "pass" or "fail" indication. A "pass" indication shows that there were no errors identified while a "fail" indication shows that one or more errors occurred. In order for a network device that has failed to receive a pass, all of the errors should be resolved, as discussed above. Once a network device passes all the phases, the network device is made available for use by the network.

In another embodiment, the interconnections among network devices are determined by testing different groups of network devices in each phase. For example, the first phase of checking for interconnections may only focus on certain types of equipment. Thus, the first phase may only test more basic or fundamental network devices like power controllers, terminal servers, switches, routers, and CPU's. Subsequent phases may then test both the previously tested network devices and connections and also additional types of network devices, such as load balancers, firewalls, fiber channel switches, disk arrays, and external hubs.

In addition, each phase may check for different types of information based on the type of device. For example, in a serial connection phase, devices such as CPU's, load balancers and firewalls may only be checked for serial connections and that the particular device is indeed of the type specified in the database (e.g., a CPU, load balancer or firewall). In a subsequent phase, such as an Ethernet phase, those devices may be checked not only for their Ethernet connections and that they are the type of network device indicated in the database, but those network devices may also be checked to determine their IP addresses.

VIII. Example of Multiple Phase Testing

Figure 4:
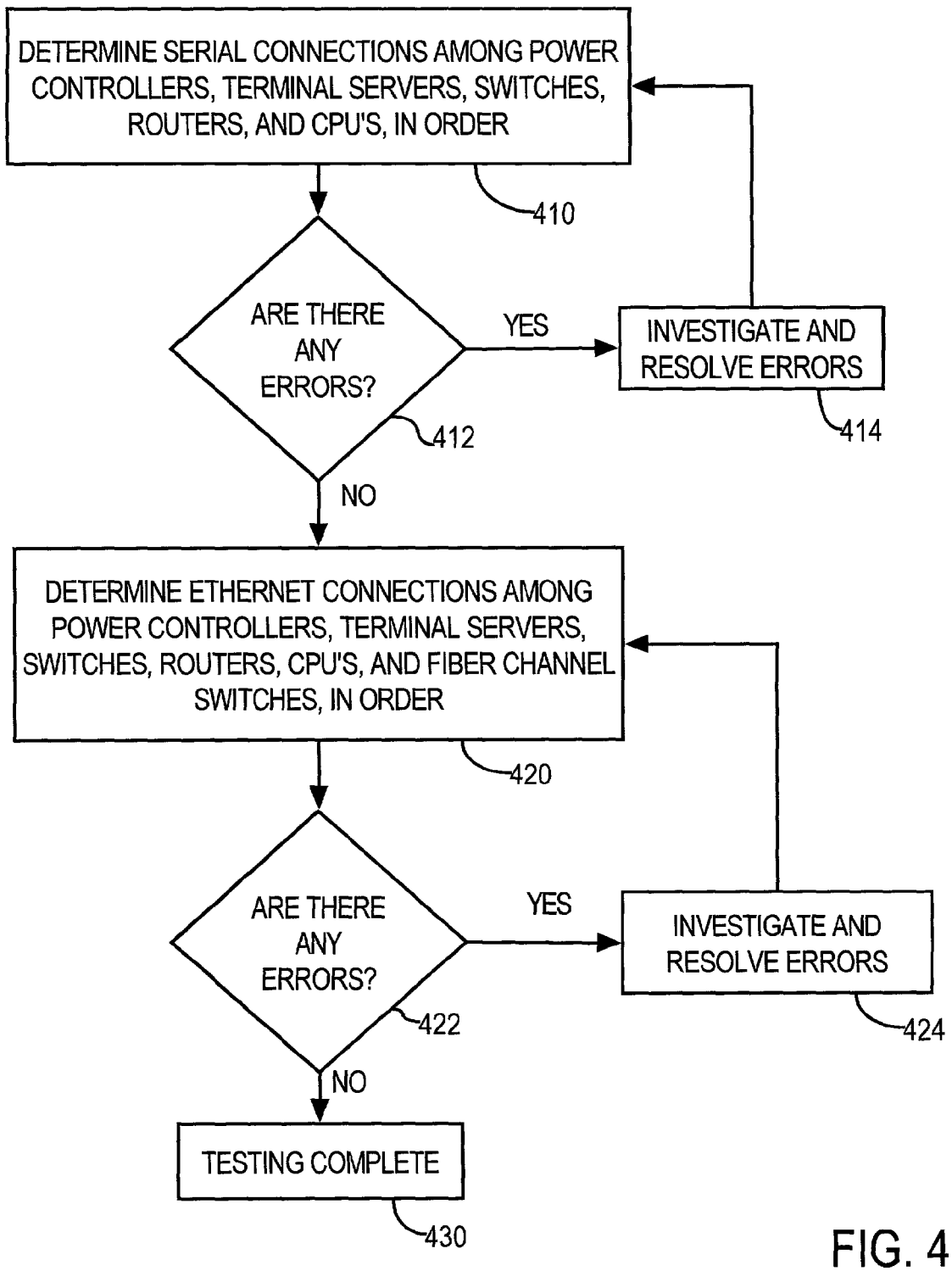
FIG. 4 is a flowchart that illustrates an overview of one embodiment of using multiple phases, groupings of network devices, and a specified order among those network devices to determine the interconnections among network devices.

FIG. 4 is a flowchart that illustrates an overview of one embodiment of using multiple phases, groupings of network devices, and a specified order among those network devices to determine the interconnections among network devices. However, the multiple phase approach, grouping approach, and order approach need not necessarily be combined. Also, the order of the phases, groupings of the network devices, and order of testing network devices in the groupings are chosen as representative samples only, and other orders and groupings may be chosen depending on the particular network.

In FIG. 4, the first testing phase is to determine the serial connections among a specified set of devices, as shown in block 410. The set of devices for the serial connection phase example includes power controllers, terminal servers, switches, routers, and CPU's. The listed types of devices all have serial connections, and thus may be tested in the serial connection phase.

In addition, the order of testing the devices in the serial connection phase may be as specified in block 410: power controllers, terminal servers, switches, routers, and CPU's. Testing the power controllers first is useful because the power cycling approach discussed above relies on the ability to turn network devices on and off. If there are problems with the connections to the power controllers, testing in other phases may more difficult if the power controllers cannot be used to cycle other network devices.

Testing terminal servers and switches before other devices may also be useful because both terminal servers and switches are among those commonly monitored for alterations or changes resulting from the power cycling of particular network devices. The alterations and changes indicate whether or not the particular network device is connected to the terminal servers and switches, as discussed above. By ensuring that the serial connections to the terminal servers and switches are properly established, the terminal servers and switches may be relied upon for testing in subsequent phases.

After the serial connection testing is complete in block 410, a check is made to determine if there are any errors, as shown in block 412. In the example shown in FIG. 4, a check for errors to be addressed is made at the end of the phase for those network devices that did not pass the serial phase of the testing. However, individual network devices may also be flagged for investigation of problem connections during the serial connection phase.

As shown in block 414, any errors from the serial connection phase are investigated and resolved, and then the serial connection test is repeated to verify that the errors have been corrected. Please refer to the discussion of block 270 of FIG. 2 above for details. If there are no errors from the serial connection phase, then the testing continues to the next phase.

In FIG. 4, the second testing phase is to determine the Ethernet connections among a specified set of devices, as shown in block 420. The set of devices for the Ethernet connection phase example includes the same network devices as in the serial connection test, namely power controllers, terminal servers, switches, routers, and CPU's. Other types of network devices that have Ethernet connections may also be tested, such as fiber channel switches, as shown in block 420.

In addition, the order of testing the devices in the serial connection phase may be as specified in block 420: power controllers, terminal servers, switches, routers, CPU's, and fiber channel switches. The same rationale for the order in the serial connection testing applies here for the Ethernet connection testing. The additional device type, fiber channel switches, is added at the end of the testing sequence after the other, more common or basic types of network devices.

After the serial connection testing is complete in block 420, a check is made to determine if there are any errors from the Ethernet testing, as shown in block 422. As with the serial connection errors, either all the errors may be addressed at one time as shown in FIG. 4 or they may be addressed device by device as the errors are identified.

Similar to block 414, any errors from the serial connection phase are investigated and resolved, as shown in block 424. Then the Ethernet connection test is repeated to verify that the errors have been corrected. If there are no errors from the serial connection phase, then the testing continues to the next phase.

After resolution of the errors from the Ethernet phase is complete, testing may return to the serial connection phase, block 410, instead of the Ethernet connection phase, block 420. The rationale for such an alternative approach is to verify that resolution of the errors from the Ethernet phase did not introduce errors in the serial connections. For example, in attempting to correct an incorrect Ethernet connection, a serial connection may be incorrectly changed as well or perhaps a serial connection may come loose during work to resolve an error from the Ethernet testing phase.

In the simplified example of FIG. 4, there is no next phase because the testing is complete, as shown in block 430. However, as discussed above, other phases may be included. For example, after the phases shown in FIG. 4, there may also be a fiber connection phase and a rigid wiring check phase that is based upon the network wiring guidelines. The additional phases would have the same analogous steps and blocks in a figure similar to FIG. 4 for the serial and Ethernet testing phases.

Similarly, even before the serial connection phase shown in block 410 of FIG. 4, there may be additional phases. For example, there may be a check-in phase for ensuring that the equipment is functional and also a hardware installation phase to ensure that the equipment is properly installed in the equipment racks and powered. The check-in and installation phases are discussed in more detail below in the Assumptions section. Also, following the check-in and hardware installation phase, there may be an initial check phase via the control device and the more basic network wiring guidelines. The initial check phase is a type of coarse checking that may just focus on identifying gross errors, such as verifying the number of basic connections for each network device.

Therefore, while the example of FIG. 4 only shows a serial connection testing phase and an Ethernet testing phase, a more complete example may include any or all of the following phases (or even others not listed herein): (1) check-in phase, (2) hardware installation phase, (3) initial network wiring guideline check phase, (4) serial connection phase, (5) Ethernet connection phase, (6) fiber connection phase, and (7) rigid network wiring guideline check phase. The ordering of the phases above is illustrative only, and other ordering of the phases may be used.

The use of multiple phases and testing different groupings allows for a structured and systematic testing approach. As a result, the more basic equipment and connections are verified first and any problems identified and resolved. The basic network devices and connections form the basis for testing additional network devices and connections. Also, information determined from the early phases may be used to determine additional information in a later phase, such as using a MAC address obtained during a serial connection phase to later determine an IP address during an Ethernet connection phase. Thus, as the testing phases are performed, the information about the interconnections among the network devices grows and details are added until a complete representation of the interconnections among the network devices is obtained.

IX. Assumptions

The implementation of the above techniques for determining interconnections in a network may involve making certain assumptions regarding the configuration of the network. For example, before implementing the automated testing discussed above, the determination of certain information via a manual procedure may be necessary. For a given embodiment, one or more of the following assumptions and the associated actions may be implemented.

One assumption that may be made is that all network devices go through a software check-in procedure. The check-in procedure may record basic information about the device, such as its type, serial number, and any other relevant characteristics. In addition, the check-in procedure may include assigning an identification number to the device plus recording its MAC addresses, World Wide Names (WWN's, the equivalent of a MAC address in a Fiber channel), and any other relevant attributes. Some equipment may be assigned IP addresses during check-in, and the assigned IP addresses may also be recorded. In addition, during check-in, any inoperative or otherwise defective equipment may be identified and marked for repair or replacement as necessary.

The check-in process may also include preparation of the network device before the network device is deployed to the network. Generally, preparation of the network device includes initializing the equipment to a default installation state for the network. For example, CPU's should be configured to boot on power-on. By ensuring that the network devices are properly checked-in, verified to be in working order, and properly initialized for network installation, the automatic network wiring testing discussed above may be more easily performed on the network devices.

Another assumption that may be made is that when a network device is deployed, the network device is correctly wired to the power source. The correct wiring may be confirmed by a manual verification step after installation. If necessary, a power walk-test may be performed, such as by having the technician turn on the device to verify that the device is correctly powered. A database may be updated to show which power controllers are connected to which devices. By ensuring that power is properly supplied, there is greater confidence that the power cycling procedure discussed above may be able to check the connections for the network device without personnel intervention.

Another assumption that may be made is that the terminal server to which each network device is connected is recorded. In addition, a manual verification may be made to confirm the connection to the terminal server. If possible, the port to which the terminal server is connected may also be recorded. Not all network devices may be connected to a terminal server, such as CPU's. By ensuring that the terminal server connections are properly recorded, there is greater confidence that the identification of alterations at the terminal servers may be successful in determining the interconnections among the network devices.

Another assumption that may be made is that the network devices are deployed according to the network wiring guidelines. In addition, a manual verification may be made that the guidelines were correctly followed. The manual check against the guidelines helps to ensure that basic, gross errors are not made when installing the network devices that would adversely impact the ability to perform the automated wiring tests discussed above.

As discussed above regarding identification and resolution of errors, one of the checks that may be performed of the actual connections is to compare that data against the network wiring guidelines. Also as discussed above regarding the use of multiple phases, the final phase of a multiple phase verification may be a rigid check against the network wiring guidelines. The automated verifications help to identify any errors made during the installation of the network devices that may not be identified during the manual verification of the network wiring guidelines as described herein. The subsequent verifications may be necessary because, as discussed before, not all manual checks are effective due to the occurrence of human error.

Another assumption that may be made is that the switch fabric is correctly deployed. The switch fabric will generally contain a minimum of two of each of the following three types of devices: core switches, access switches, and externally facing routers. A manual check may be made of the switch fabric to ensure that the switch fabric is deployed correctly.

Because the switches are often used to determine the connections with other devices, such as by looking for raised traps as discussed above, having the switch fabric correctly deployed precludes switch installation problems from interfering with the determination of other interconnections.

Another assumption that may be made is that Ethernet interfaces on CPU's may be identified by unique vendor codes on each interface. Generally, the IEEE vendor identification scheme is used to establish the vendor code for a particular device. The IEEE vendor identification scheme allows for a check during the automated wiring discovery testing to verify that the correct vendor was identified in the database. For example, if the database specifies that a particular network device is manufactured by Cisco, but the vendor code for the network device specifies APC, then that would likely be indicative of an incorrect database entry for that device. By ensuring that the CPU interfaces are identifiable by the vendor codes, misconnections between different devices may be identified.

X. Manual Checks and Phases

Not all of the checking and verification activities associated with determining interconnections among network devices may be automated in a given implementation or embodiment. Several assumptions may involve manual checks or verifications of certain device, connections, and related information. For example, the check-in procedure is performed via a manual process because personnel involvement is necessary to prepare the equipment prior to installation into the network where automated testing may then be performed.

In addition, the installation phase of putting the network devices into the equipment racks is typically a manual phase. In one embodiment, the network devices are deployed based upon a network wiring procedure and a manual verification is made that the procedure was correctly followed. The network wiring procedure is different from the network wiring guidelines discussed above. The focus of the network wiring procedure is to physically install the network device in the proper equipment rack and then establish any necessary connections, such as power, serial, Ethernet, and fiber.

The network wiring procedure may specify that certain steps be performed when installing a network device. For example, prior to installing the network device into the equipment rack, a device identification number may be assigned and the device labeled with the assigned number. For connections, prior to installation, a connection number for the type of connection may be allocated and then the connection may be labeled at both ends with that number for identification. Labeling the network devices and connections aids the resolution of any errors that are subsequently identified by properly labeling the physical devices and connections.

The network wiring procedure may include recording information about both the network device and also any connections made to the network device. The recorded information may be included in a table or database, such as database 112 in FIG. 1. The information may be grouped or organized as desired, such as having a separate table or sheet for devices and another for connections. The recorded information recorded may be used to check against the connection and device information determined during the network wiring discovery testing discussed above. Any problems or errors may then be detected and resolved, thus ensuring the accuracy of both the connections and the information contained in the database.

For example, the device information may include the identification number, device type, device name, manufacturer, MAC address(es), the number of the rack into which the device is installed, the position of the device in the rack, and any other available information, such as the device's IP address, if available.

For connections, the information recorded may include the identification number of the starting device, the port on the starting device that starts the connection, the identification number of the terminating device at the other end of the connection, the port on the terminating device that terminates the connection, and the label with which the connection is labeled. Also, after establishing the connection, a cross check may be made against the information recorded for the network devices being connected.

The network wiring procedure helps to ensure that the devices are correctly installed in the racks, that the connections are correctly established according to a network wiring procedure, and that any available information has been recorded. Therefore, the network wiring procedure helps to provide increased confidence in the ability of the automatic network wiring discovery approach described herein to determine connections and identify any associated problems.

XI. Comparison Testing to Identify Changes

During operation of a network, the normal management and maintenance activities conducted each day may result in unintended changes to the network configuration. For example, if a component fails and must be replaced, the connections to the failed component may not be restored in the same manner for the new component, perhaps due to human error in making an incorrect connection or in not ensuring that a wire is fully connected. Such unintended changes may cause additional problems that must be diagnosed and resolved, and such additional problems may not be immediately evident.

According to one embodiment, one or more phases of testing are repeated and the results compared previous testing to identify changes to the network between the times that the one or more phases of testing are performed. For example, a serial connection testing phase and an Ethernet connection testing phase may be performed. Each of the two phases of testing may be repeated after a predetermined length of time, such as the next day. The results of the testing performed on each day are compared to identify any differences, which may then be flagged for review by an operator. The operator may investigate and resolve the differences to determine why they occurred and make any changes to the network that are appropriate. For example, if a connection was improperly moved from one component to another, a technician may be tasked with restoring the original configuration.

According to another embodiment, one or more phases of testing are repeated to ensure continuing compliance with a set of network wiring guidelines. For example, a maintenance operation may result in a configuration change that does not comply with the network wiring guidelines as a result of human error in reestablishing an existing connection. Repeating a "rigid wiring check" phase may help identify such errors for investigation.

The repetition of one or more phases of testing may be performed on a periodic basis or as needed. For example, some phases may be repeated according to a regular schedule such as once per week, once per day, once per hour, or the phases may be run continuously to monitor the status of the network. The results of each new test may be examined to identify errors, and the results of different tests may be compared to identify changes. Testing may be repeated as needed, such as in response to the identification of a problem in the network as part of an effort to identify the cause of the problem. Such as needed testing may be performed to identify errors or to compare test results to identify changes.

XII. Hardware Overview

Figure 5:
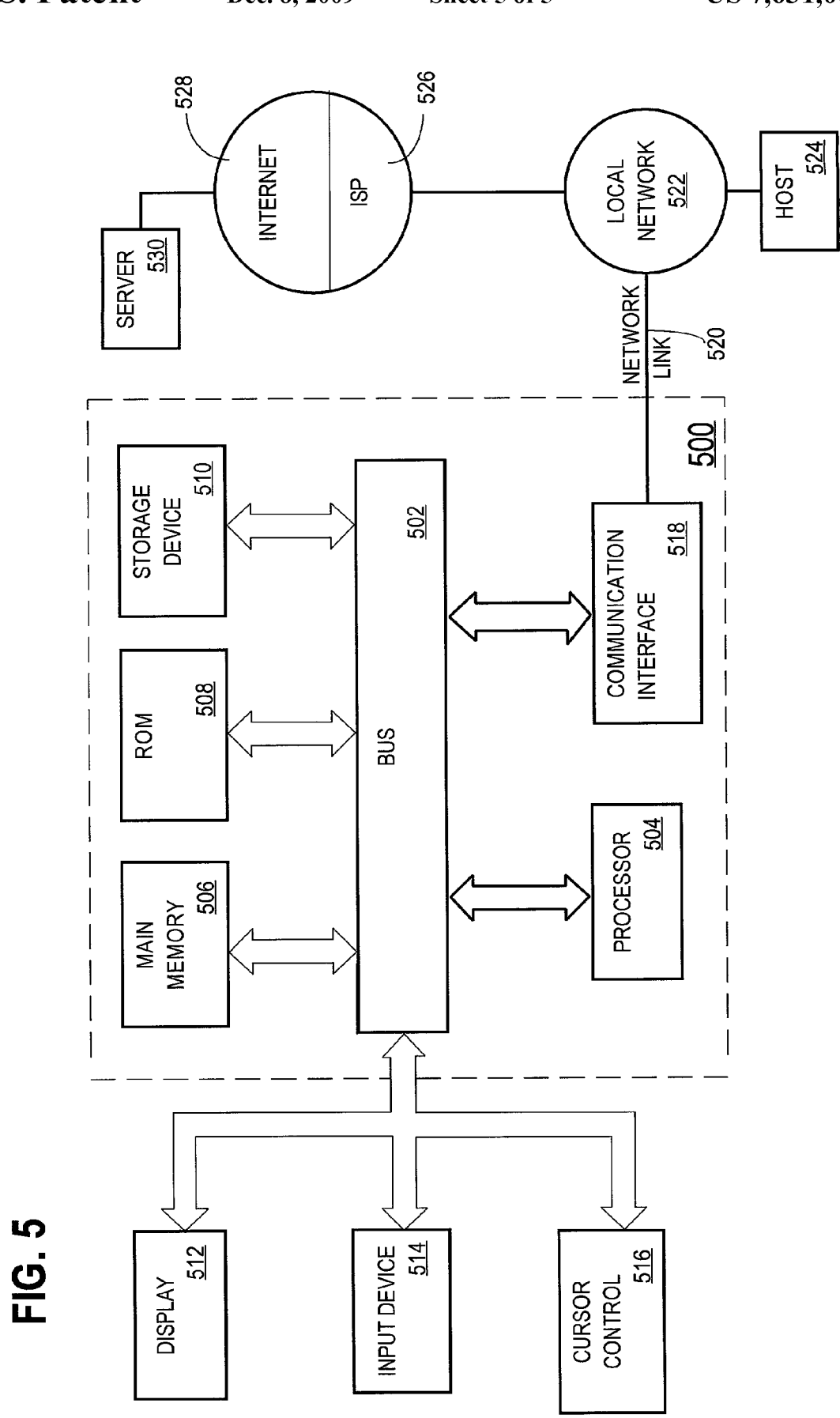
FIG. 5 is a block diagram that illustrates a computer system upon which an embodiment may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. The input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media may also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as the code is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for determining one or more logical interconnections among a plurality of network devices that are interconnected in a network in an indefinite relationship, wherein a power state is associated with a first network device, the method comprising the computer-implemented steps of:
   changing the power state of the first network device from either (a) off to on or (b) from on to off;
   identifying whether an alteration occurs at a second network device in response to changing the power state of the first network device, wherein the alteration corresponds to an indication of a new active link to the second network device when (a) is performed, wherein the alternation corresponds to an indication of a new inactive link to the second network device when (b) is performed; and
   when the alteration occurs at the second network device, creating and storing first information representing a logical connection of the first network device to the second network device.

2. The method as recited in claim 1, further comprising the steps of:
   retrieving second information from a database, wherein the second information represents one or more logical connections of the first network device to the second network device;
   comparing the second information from the database with the first information; and
   generating an error if the second information indicates that a logical connection exists between the first and second network devices but the first information does not indicate that the logical connection exists between the first and second network devices.

3. The method as recited in claim 1, wherein the second network device is a terminal server and wherein the step of identifying whether the alteration occurs at the terminal server further comprises:
   determining whether a state of a port of the terminal server is changed from inactive to active in response to changing the power state of the first network device.

4. The method as recited in claim 1, wherein the second network device is a switch and wherein the step of identifying whether the alteration occurs at the switch further comprises:
   determining whether a trap on a port of the switch is raised in response to changing the power state of the first network device.

5. The method as recited in claim 1, further comprising:
   receiving, in response to changing the power state of the first network device, additional information from the first network device; and
   recording the additional information.

6. The method as recited in claim 1, wherein changing the power state of the first network device is in response to a signal from a third network device.

7. The method as recited in claim 6, wherein the first network device is connected to a power controller and wherein the signal from the third network device is sent to the power controller that changes the power state of the first network device.

8. A computer-readable storage medium storing one or more sequences of instructions for determining one or more logical interconnections among a plurality of network devices that are interconnected in a network in an indefinite relationship, wherein a power state is associated with a first network device, which instructions, when executed by one or more processors, cause the one or more processors to carry out the steps of:
   changing the power state of the first network device from either (a) off to on or (b) from on to off;
   identifying whether an alteration occurs at a second network device in response to changing the power state of the first network device, wherein the alteration corresponds to an indication of a new active link to the second network device when (a) is performed, wherein the alternation corresponds to an indication of a new inactive link to the second network device when (b) is performed; and
   when the alteration occurs at the second network device, creating and storing first information representing a logical connection of the first network device to the second network device.

9. The computer-readable storage medium as recited in claim 8, further comprising instructions which, when executed by one or more processors, cause the one or more processors to carry out the steps of:
   retrieving second information from a database, wherein the second information represents one or more logical connections of the first network device to the second network device;
   comparing the second information from the database with the first information; and
   generating an error if the second information indicates that a logical connection exists between the first and second network devices but the first information does not indicate that the logical connection exists between the first and second network devices.

10. The computer-readable storage medium as recited in claim 8, wherein the second network device is a terminal server and wherein the step of identifying whether the alteration occurs at the terminal server further comprises instructions which, when executed by one or more processors, cause the one or more processors to carry out the step of:

determining whether a state of a port of the terminal server is changed from inactive to active in response to changing the power state of the first network device.

11. The computer-readable storage medium as recited in claim 8, wherein the second network device is a switch and wherein the step of identifying whether the alteration occurs at the switch further comprises instructions which, when executed by one or more processors, cause the one or more processors to carry out the step of:

determining whether a trap on a port of the switch is raised in response to changing the power state of the first network device.

12. The computer-readable storage medium as recited in claim 8, further comprising instructions which, when executed by one or more processors, cause the one or more processors to carry out the steps of:

receiving, in response to changing the power state of the first network device, additional information from the first network device; and recording the additional information.

13. The computer-readable storage medium as recited in claim 8, wherein changing the power state of the first network device is in response to a signal from a third network device.

14. The computer-readable storage medium as recited in claim 13, wherein the first network device is connected to a power controller and wherein the signal from the third network device is sent to the power controller that changes the power state of the first network device.

15. An apparatus for determining one or more logical interconnections among a plurality of network devices that are interconnected in a network in an indefinite relationship, wherein a power state is associated with a first network device, the apparatus comprising:

a means for changing the power state of the first network device from either (a) off to on or (b) from on to off;

a means for identifying whether an alteration occurs at a second network device in response to changing the power state of the first network device, wherein the alteration corresponds to an indication of a new active link to the second network device when (a) is performed, wherein the alternation corresponds to an indication of a new inactive link to the second network device when (b) is performed;

and a means for creating and storing first information representing a logical connection of the first network device to the second network device, when the alteration occurs at the second network device.

16. The apparatus as recited in claim 15, further comprising:

a means for retrieving second information from a database, wherein the second information represents one or more logical connections of the first network device to the second network device;

a means for comparing the second information from the database with the first information; and a means for generating an error if the second information indicates that a logical connection exists between the first and second network devices but the first information does not indicate that the logical connection exists between the first and second network devices.

17. The apparatus as recited in claim 15, wherein the second network device is a terminal server and wherein the means for identifying whether the alteration occurs at the terminal server further comprises:

a means for determining whether a state of a port of the terminal server is changed from inactive to active in response to changing the power state of the first network device.

18. The apparatus as recited in claim 15, wherein the second network device is a switch and wherein the means for of identifying whether the alteration occurs at the switch further comprises:

a means for determining whether a trap on a port of the switch is raised in response to changing the power state of the first network device.

19. The apparatus as recited in claim 15, further comprising:

a means for receiving, in response to changing the power state of the first network device, additional information from the first network device; and a means for recording the additional information.

20. The apparatus as recited in claim 15, wherein changing the power state of the first network device is in response to a signal from a third network device.

21. The apparatus as recited in claim 20, wherein the first network device is connected to a power controller and wherein the signal from the third network device is sent to the power controller that changes the power state of the first network device.

\* \* \* \* \*

UNITED STATES PATENT AND TRADEMARK OFFICE
CERTIFICATE OF CORRECTION

PATENT NO. : 7,631,064 B1  Page 1 of 1
APPLICATION NO. : 09/835059
DATED : December 8, 2009
INVENTOR(S) : Mark Gray It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1104 days.

Signed and Sealed this

Second Day of November, 2010

David J. Kappos
*Director of the United States Patent and Trademark Office*